Patented May 18, 1943

2,319,261

UNITED STATES PATENT OFFICE 2,319,261

STABILIZING CHLORINATED HYDROCARBONS

Arthur L. Pitman, Berkeley, Calif., assignor to Westvaco Chlorine Products Corporation, South Charleston, W. Va., a corporation of Delaware No Drawing. Application June 26, 1940, Serial No. 342,580

9 Claims. (Cl. 260—652.5)

This invention relates to stabilizing chlorinated hydrocarbons; and it comprises chlorinated hydrocarbons, such as trichlorethylene, stabilized against deterioration by a small amount of a mono-alkyl or mono-aralkyl ether of hydroquinone dissolved therein, the amount dissolved being usually between about 0.001 and about 0.1 per cent of the chlorinated hydrocarbon; all as more fully hereinafter set forth and as claimed.

The chlorinated hydrocarbons are used extensively in commercial processes as solvents for greases and other organic matters. For example, chlorinated hydrocarbons are widely used in degreasing metallic articles, extracting caffein from coffee, and in dry cleaning. They are particularly advantageous for such purposes because of their non-inflammability, convenient boiling points, high solvent power, and chemical inertness. Trichlorethylene, which has a boiling point of about 87° C., is one of the compounds of this class which are widely used. Others are perchlorethylene, and numerous other chlorinated aliphatic hydrocarbons.

While most of these chlorinated hydrocarbons are quite stable insofar as chemical reactivity is concerned, they all have some tendency to undergo internal changes over long periods of time with a development of acidity, which renders them unsuitable for some uses. In most uses of these solvents, as in dry cleaning and degreasing, a charge of liquid is used over and over again. Deteriorative changes are therefore cumulative, and are to be avoided.

The nature of the deteriorative changes—that is, the chemical mechanism involved—is not quite definitely known. Such changes are known to be associated with exposure to both light and air and with the presence of moisture and of acid. The development of acidity accelerates deterioration; it is a self-accelerating action. Trichlorethylene, perhaps due to its unsaturated character, is susceptible to this type of deterioration, but it tends to occur with all chlorinated hydrocarbons of this type.

The acidity developed on deterioration of chlorinated hydrocarbons is always relatively small on a percentage basis, but it is quite undesriable. In shipping in iron and steel drums, which is the usual practice, any acidity whatsoever is undesirable. And for many purposes, the user of the solvent cannot tolerate acidity. This is true in dry cleaning where trichlorethylene and other similar chlorinated hydrocarbons are used extensively. Apart from damage to apparatus, any free acid contained in the solvent is detrimental to the cloth and to many dyes. When using trichlorethylene in extracting caffein from coffee, free acidity is also undesirable.

Many different chemical bodies have been proposed for use as stabilizers in preventing the deteriorative changes in chlorinated solvents. The nature of the changes being unknown, the reason making these bodies operative is also unknown. Stabilizing action must be determined empirically. But, as a matter of practical experience, many stabilizers have been developed of greater or less efficiency. Among the most satisfactory of those known prior to this invention are thymol and hexylresorcinol. Either will stabilize a chlorinated hydrocarbon for a substantial period of time if used in sufficient quantity. It is an object achieved in the present invention to provide a stabilizer effective in less quantity and giving a more efficient stabilizing action.

It has now been discovered that the mono-alkyl and mono-aralkyl ethers of hydroquinone are particularly effective stabilizers for chlorinated hydrocarbons, and that when added to the chlorinated hydrocarbons in very minute amounts, these ethers will prevent the development of acidity for considerable periods. Such stabilizers act as anti-catalysts as regards development of acidity, although the exact nature of the stabilizing action exerted thereby is not apparent. The stabilizing action is obtained with very small amounts of these ethers—less than 1 per cent and usually of the order of 0.001 to 0.01 per cent.

As stated, the compounds which are effective in these minute quantities in stabilizing chlorinated hydrocarbons are the mono-alkyl and mono-aralkyl ethers of hydroquinone. These may be represented structurally by the formula

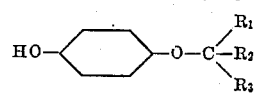

wherein $R_1$, $R_2$ and $R_3$ are hydrogen, alkyl groups or aryl groups. A typical mono-alkyl ether is the mono-methyl ether of hydroquinone, having the formula

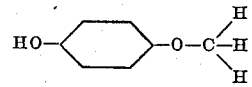

Other useful mono-alkyl ethers of hydroquinone include the mono-ethyl ether and all of the mono-propyl and mono-butyl ethers. Among the useful mono-aralkyl ethers are such compounds as the mono-benzyl, mono-phenyl-propyl and mono-phenyl-ethyl ethers of hydroquinone. Typical of this group is the mono-benzyl ether, also known as para-hydroxy phenyl benzyl ether, which has the formula

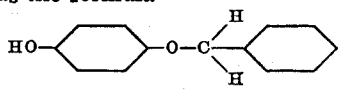

All of these mono-ethers of hydroquinone are effective in concentrations of the order of 0.001 to 0.01 per cent for stabilizing chlorinated hydrocarbons. Among the chlorinated hydrocarbons with which they can be used are trichlorethylene, perchlorethylene, propyl chloride, butyl chloride and others.

The amounts of these mono-alkyl and mono-aralkyl ethers of hydroquinone which are used in accordance with this invention for stabilizing are so small as to rank as traces, and in fact are rather difficult to detect by analysis. This being the case, the properties of chlorinated hydrocarbons stabilized by means of these compounds, other than their stability, are not materially modified by the addition. Chlorinated hydrocarbons containing a stabilizing amount of a mono-alkyl or mono-aralkyl ether of hydroquinone may be used for any purpose for which the unstabilized chlorinated hydrocarbon may be used, but substantially without difficulties due to acid formation.

To determine the effectiveness of this invention, a series of accelerated tests was conducted, as described more fully hereinbelow. These accelerated tests show in a few days the results which would normally be obtained with chlorinated hydrocarbons, with and without addition of the stabilizers, over long periods of time, in storage and under adverse conditions of use. The results of these tests adequately demonstrate the advantageous stabilizing effect of minute amounts of the ethers employed in accordance with this invention.

*Example 1.*—In one accelerated test under such conditions that unstabilized trichlorethylene breaks down in a few hours, only 14 drops of N/100 NaOH were required to neutralize the acidity in 25 cubic centimeters of a sample stabilized with 0.005 per cent of the mono-benzyl ether of hydroquinone (where is also known as para hydroxy phenyl benzyl ether) after a test period of 63 days. The original trichlorethylene required four drops of the same solution to neutralize the acidity in 25 cubic centimeters.

*Example 2.*—In another type of accelerated stability test, samples of trichlorethylene were exposed to very strong illumination. A sample to which 0.005 per cent of the mono-benzyl ether of hydroquinone had been added developed an acidity equivalent to 0.001 per cent HCl after 24 hours exposure. An unstabilized sample developed an acidity equivalent to 0.007 per cent of HCl after only three hours exposure.

*Example 3.*—In another test, a comparison was made between the stabilizing effect of hexyl resorcinol and the mono-benzyl ether of hydroquinone in trichlorethylene. In this test the samples were boiled and refluxed under conditions that caused unstabilized trichlorethylene to deteriorate very rapidly. A sample containing 0.003 per cent of the mono-benzyl ether of hydroquinone developed an acidity equivalent to 0.01 per cent HCl in 63 days, while a sample stabilized with the same quantity of hexyl resorcinol developed a corresponding acidity in only 45 days.

In these examples, the results obtained by the addition of the mono-benzyl ether of hydroquinone to trichlorethylene are illustrated. Substantially identical results are obtained when using the mono-methyl ether and other mono-alkyl and mono-aralkyl ethers of hydroquinone. Also, it was established in similar tests and in commercial tests that the mono-benzyl ether and the other mono-aralkyl and mono-alkyl ethers have a similar beneficial stabilizing effect on other chlorinated hydrocarbons, as well as trichlorethylene. Therefore while some aspects of this invention have been described with particular reference to certain specific embodiments, the invention is not restricted to such embodiments except as defined in the appended claims.

This application is a continuation-in-part of a prior and copending application, Serial No. 261,157, filed March 10, 1939.

What is claimed is:

1. Trichlorethylene containing a stabilizing amount of the mono-benzyl ether of hydroquinone.

2. Trichlorethylene containing 0.001 to 0.01 per cent of the mono-benzyl ether of hydroquinone.

3. Trichlorethylene containing a stabilizing amount of the mono-methyl ether of hydroquinone.

4. As a composition of matter, a chlorinated hydrocarbon solvent of the class consisting of trichlorethylene and perchlorethylene stabilized by the presence therein of a small amount of a compound having the formula $$HO-\langle\rangle-O-C\begin{smallmatrix}R_1\\R_2\\R_3\end{smallmatrix}$$

wherein each of the constituents $R_1$, $R_2$ and $R_3$ is selected from the class consisting of alkyl groups, aryl groups and hydrogen.

5. As a composition of matter, a chlorinated hydrocarbon solvent of the class consisting of trichlorethylene and perchlorethylene stabilized by the presence of a small amount of a mono-aralkyl ether or hydroquinone.

6. As a composition of matter, a chlorinated hydrocarbon solvent of the class consisting of trichlorethylene and perchlorethylene stabilized by a small amount of a mono-alkyl ether of hydroquinone.

7. As a composition of matter, a chlorinated hydrocarbon solvent of the class consisting of trichlorethylene and perchlorethylene stabilized by a small amount of the mono-benzyl ether of hydroquinone.

8. As a composition of matter, a chlorinated hydrocarbon solvent of the class consisting of trichlorethylene and perchlorethylene stabilized by a small amount of the mono-methyl ether of hydroquinone.

9. The composition of claim 4, wherein said compound is present in a proportion from 0.001 to 0.01 per cent by weight, on the chlorinated hydrocarbon.

ARTHUR L. PITMAN.